United States Patent [19]

Deloche et al.

[11] Patent Number: 6,030,431
[45] Date of Patent: Feb. 29, 2000

[54] METHOD FOR AN IMPROVED ENERGY INPUT INTO A SCRAP BULK

[75] Inventors: Daniel Deloche, Paris, France; Karl Brotzmann, Amberg, Germany

[73] Assignee: L'Air Liquide, Societe Anonyme pour l'Etude et l'Expolitation des Procedes George Claude, Paris, France

[21] Appl. No.: 08/973,221

[22] PCT Filed: Jun. 11, 1996

[86] PCT No.: PCT/EP96/02525

§ 371 Date: Feb. 17, 1998

§ 102(e) Date: Feb. 17, 1998

[87] PCT Pub. No.: WO96/41896

PCT Pub. Date: Dec. 27, 1996

[30] Foreign Application Priority Data

Jun. 13, 1995 [DE] Germany .......................... 195 21 518

[51] Int. Cl.⁷ .................................................. C21C 5/52
[52] U.S. Cl. .............................................. 75/414; 75/581
[58] Field of Search ...................................... 75/414, 581

[56] References Cited

U.S. PATENT DOCUMENTS 5,286,277  2/1994  Aizatulov et al. ..................... 75/523
5,599,375  2/1997  Gitman .................................. 75/10.42

FOREIGN PATENT DOCUMENTS 2759129  12/1977  Germany .
2177118   1/1987  United Kingdom .

OTHER PUBLICATIONS

Patent Abstracts of Japan vol. 012, No. 117, Apr. 13, 1988, JP 62 238318.

Patent Abstracts of Japan vol. 009, No. 309, Dec. 5, 1985, JP 60 149710.

Patent Abstracts of Japan vol. 008, No. 046, Feb. 29, 1984, JP 58 204111.

*Primary Examiner*—Melvyn Andrews
*Attorney, Agent, or Firm*—Burns, Doane, Swecker & Mathis, LLP

[57] ABSTRACT

Provided is a method for improving energy input in heating and melting of a scrap bulk. The method includes burning a channel into a scrap bulk with hot, oxygen-containing gas jet. Additional energy for the heating and melting of the scrap bulk is then input through this channel.

14 Claims, No Drawings

METHOD FOR AN IMPROVED ENERGY INPUT INTO A SCRAP BULK

BACKGROUND OF THE INVENTION (i) Field of the Invention

The present invention relates to the heating and melting of a scrap bulk and, more particularly, to a method for improving energy input in heating and melting of a scrap bulk.

(ii) Description of the Related Art

The output-limiting step in the heating and melting of scrap is the transfer of energy to the scrap bulk. As a result, the melting phase may be supported, for example, by burners installed on the side walls in the case of electric arc finaces. The transfer of heat into the scrap bulk by these burners, however, is limited since the conduction of heat through the large interstitial volume of the scrap charge is poor. The energy which can be introduced by burners is therefore limited to a max. 10% of the total energy required for scrap melting.

A known converter method for scrap melting provides for melting the scrap column from below by means of bottom nozzles that are operated with oxygen and finely divided coal. This achieves an optimal transfer of the heat of the hot combustion gases to the scrap bulk. In a variant of this method, coke is charged at the bottom of the converter before the scrap is added and the coke is then burned using oxygen. In small converters it has proven possible to convert scrap to liquid steel with this method at a coke consumption of approximately 220 kg. Additional energy is transferred to the scrap from above through combustion of the reaction gases using an oxygen jet.

In another method, a natural gas- or oil-oxygen burner is installed in the side wall immediately above the floor of the converter. This method does make possible melting of the scrap, but a considerable portion of the iron is oxidized, and the liquefied iron must be removed from the converter at a temperature just above the melting point in order to undergo post-treatment in a separate container.

European Patent 0 350 982 A1[1] discloses a method for improving the energy input during the heating and melting of a scrap bulk. In this method, a channel is burned into the scrap bulk by a burner having the form of a lance and an oxygen lance is then inserted into the channel. This lance insertion has proven to be impossible to execute in actual practice.

In summary, one should note that in all the heretofore known methods it has not been possible to achieve a substantial transfer of energy from the combustion of fossil fuels, whether coal, oil, or natural gas, into a scrap bulk without concomitant strongly perturbing secondary reactions and with the required high thermal efficiency.

SUMMARY AND OBJECTS OF THE INVENTION

The object of the invention is the transfer of energy into a scrap bulk at high thermal Efficiencies and without the appearance of perturbing secondary reactions.

The aforesaid object is achieved by a method for improving the energy input during the heating and melting of a scrap bulk, in which a channel is burned into the scrap bulk and additional energy for the heating and melting of the scrap bulk is input through this channel, wherein said method is characterized in that the said channel is burned into the scrap bulk by means of a hot, oxygen-containing gas jet.

DETAILED DESCRIPTION OF THE PREFERRED EMBODIMENTS

It has surprisingly been found that a hot, oxygen-containing gas jet can burn a channel into a scrap bulk within only a few minutes.

Thus, it has been possible, for example, with a central nozzle to burn a channel approximately 20 cm in diameter and 3 m deep within 3 minutes using a hot air jet of 2000 $M^3$/hour and a draft temperature of 1400° C., an exit velocity from the hot air nozzle of 600 m/s, and the addition of 100 $Nm^3$/hour natural gas.

A channel can be burned into the scrap bulk without the addition of fossil fuel using a hot, oxygen-containing gas jet alone. However, channel burning is preferably executed in the presence of fossil fuel. The fossil fuel can be present in the scrap bulk, but is preferably added to the gas jet. It should be understood that both variants, addition of fossil fuel to the scrap bulk and to the gas jet, are possible.

Mainly natural gas, but also petroleum, coal, and coke will be used as the fossil fuel.

The quantity of fossil fuel addition is advantageously kept low enough that free oxygen will still be present in the gas jet. The free oxygen supports a more rapid formation of the opening in the scrap bulk. In addition, combustible substances, which are always present in a scrap bulk, will be burned within the scrap column, which leads to a particularly favorable energy utilization.

Natural gas is particularly preferred as the fossil fuel. At approximately 2800° C., dissociation into radicals takes place during combustion with oxygen. The gases diffuse into the scrap bulk and at the lower temperature release their recombination energy to the scrap. This reliably secures a particularly good energy transfer, the flame temperature should be as high as possible and is preferably at least 2500° C.

After an initial phase of approximately 1 to 2 minutes, the fossil fuel is most effectively added so as to secure the latest possible reaction within the gas jet. Thus, for example, natural gas is appropriately added through a nozzle in such a manner that a weak swirling with the oxygen-containing gas jet occurs. In the case of coal, it may be preferable to use the coarsest possible fraction of finely divided coal, that is, to use coal particles in the range of 0.1 to 1 mm which then burn substantially only when they are within the channel created by the gas jet.

Hot air, oxygen-enriched hot air, and also pure oxygen can be used as the hot, oxygen-containing gas. In the case of oxygen-enrichment of the gas jet, oxygen enrichment up to 30% is preferred. This can be increased, however, up to preferably 60% when cold oxygen is used for enrichment. Viewed from the perspective of the injection nozzles, it is significantly simpler to blow in hot air rather than oxygen. Hot air can be injected with ceramic nozzles, but oxygen, on the other hand, requires water-cooled nozzles.

To achieve the highest possible thermal efficiency it will be desirable to set the temperature of the oxygen-containing gas jet as high as possible. Temperatures between 1000° C. and 1600° C. have proven to be particularly advantageous in the case of hot air. However, gas jets with higher temperatures can also be used advantageously. The gas jet preferably has a temperature of at least 500° C. Oxygen can be relatively unproblematically preheated up to 1200° C. The use of hot air as well as oxygen-enriched hot air offers two essential advantages over the injection of pure cold oxygen: due to the high velocity—a consequence of the hot air having a velocity more than twice as high as the speed of sound—and due to the higher quantity of gas, a substantially higher impulse is present than for the introduction of pure oxygen. This impulse supports the burning-in of the opening. While the free oxygen present greatly favors burning of the opening, the nitrogen present provides a certain protection from oxidation during melting.

Pure hot oxygen, however, can also be used. The speed of sound is higher at higher temperatures and is, for example, approximately 900 m/s for pure oxygen at 1200° C. Thus, a higher impulse is also attainable with hot oxygen.

A practical problem at the beginning of channel burn-in is that a gas jet with the optimal high speed may be initially reflected by scrap pieces. It is therefore appropriate to operate for a short period of time, perhaps in the range of one or more minutes, at a substantially reduced speed, for example, 10 to 30% of the speed of sound, and down to approximately 100 m/s. A high fossil fuel addition is also recommended in the initial phase.

It should be stressed that a cold zone is formed directly in front of the gas injection nozzle. This may be due to a suctioning of the surrounding air. In any case, the scrap is not even oxidized.

After the first phase of an optimal channel formation, it is important to bring as much energy as possible into the channel. This is preferably achieved by the highest possible flame temperature, for example, by the use of natural gas and hot air with a flame temperature of 2800° C.

An important criterion is also the high velocity of the gas jet. The velocity of the gas jet should be at least 300 m/s. When using an oxygen gas jet, the velocity should be at least 500 m/s. The exit velocity of the gas jet is preferably 50 to 100% of the speed of sound. The speed of sound rises with temperature and at the aforementioned high temperatures is approximately 3 times higher than the speed of sound at room temperature.

An advantageous use of the method in accordance with the invention is to supply substantial quantities of additional energy to an electric arc furnace mainly during the scrap melting phase. Thus, for example, three hot draft injection nozzles with diameters of 80 mm were installed in a 100-ton electric arc furnace in the upper area of the side walls. These nozzles were operated at a hot draft flow of 2000 Nm$^3$/h per nozzle and an oxygen enrichment of 30% during the melting and ensuing refining phase, wherein 300 Nm$^3$/h oxygen was additionally added cold to the hot draft jet. The hot draft temperature was 1400° C. Fuel was added in the manner previously described, wherein after scrap melting essentially only gases formed by reaction were still suctioned in by the hot air jet and therefore no further addition of fuel into the hot draft jet was necessary. The nozzles were arranged in such a way that they blew into the space between the furnace wall and the electrodes, slanted downwards at an angle of approximately 10°. It is desirable that the jets be aligned so as to strike at a point at the bottom where the liquid steel will be formed most rapidly. If the jet strikes refractory material after burning through the scrap column, this material will be melted away in a short period of time. This is also true for the water-cooled side walls of electric arc furnaces.

In general, the gas introduction nozzles can be installed anywhere, but preferably are installed at least 30 cm above the bath surface—when using oxygen, at least 80 cm above the bath surface.

The consumption of electric energy was reduced from 480 kWh to 280 kWh in an electric arc furnace equipped with the device in accordance with the invention. The melting time of 58 minutes was simultaneously reduced to 42 minutes.

Another suitable embodiment consists of the use in the channel of two hot draft jets blowing in opposite directions, instead of one nozzle, with the result that three injection sites in the side wall will yield a total of six injection jets.

The method in accordance with the invention is not only suitable for use in electric arc furnaces. A scrap charge can also be melted using the method in accordance with the invention without the additional use of other energy sources. Fossil energy sources must then be introduced into the scrap bulk in suitable form, for example, by charging with the scrap at approximately 100 kg coal per ton. A portion of the coal can be blown in through nozzles as soon as a liquid sump has been formed. After melting the jet will act, in the known manner, as a post-combustion jet for additional energy input in order to reach the necessary tapping temperature.

The hot air is advantageously produced using a device developed specifically for this purpose, the so-called pebble heater as described in PCT WO 93/923585. The pebble heater is advantageously mounted directly on the container in the vicinity of the injection nozzles.

We claim:

1. Method for improving energy input in heating and melting of a scrap bulk, comprising the steps of:
    burning a channel into a scrap bulk with a hot, oxygen-containing gas jet having a temperature of at least 500° C.; wherein the hot oxygen-containing gas jet is supplied in first and second phases, the second phase having a jet speed which is distinct and substantially higher than the jet speed of the first phase; and
    inputting additional energy for the heating and melting of the scrap bulk through this channel.

2. Method according to claim 1, comprising burning the channel into the scrap bulk in the presence of a fossil fuel.

3. Method according to claim 2, comprising adding the fossil fuel to the gas jet.

4. Method according to claim 1, wherein said gas jet is a hot air jet.

5. Method according to claim 4, wherein said hot air jet is enriched and comprises up to 30% oxygen.

6. Method according to claim 4, wherein said hot air jet is enriched with up to 60% cold oxygen.

7. Method according to claim 1, wherein the gas jet has a temperature of 1000° C. to 1600° C.

8. Method according to claim 1, wherein said gas jet has an exit velocity of 50 to 100% of the speed of sound.

9. Method according to claim 1, wherein the gas jet has a velocity of at least 300 m/s.

10. Method according to claim 1, wherein said oxygen-containing gas jet has a velocity of at least 500 m/s.

11. Method according to claim 3, wherein the fossil fuel added to the gas jet essentially burns only when in the channel created by the gas jet.

12. The method of claim 1, wherein the first phase jet speed is from about 100 m/s to about 30% of the speed of sound.

13. The method of claim 1, wherein said first phase jet speed is from about 100 m/s to about 10% of the speed of sound.

14. The method of claim 1, wherein said first phase is maintained for about one (1) minute or more prior to said second phase.

* * * * *